July 3, 1951  J. FRIED  2,559,214
COLLAPSIBLE CAMERA
Filed May 20, 1948  2 Sheets-Sheet 1
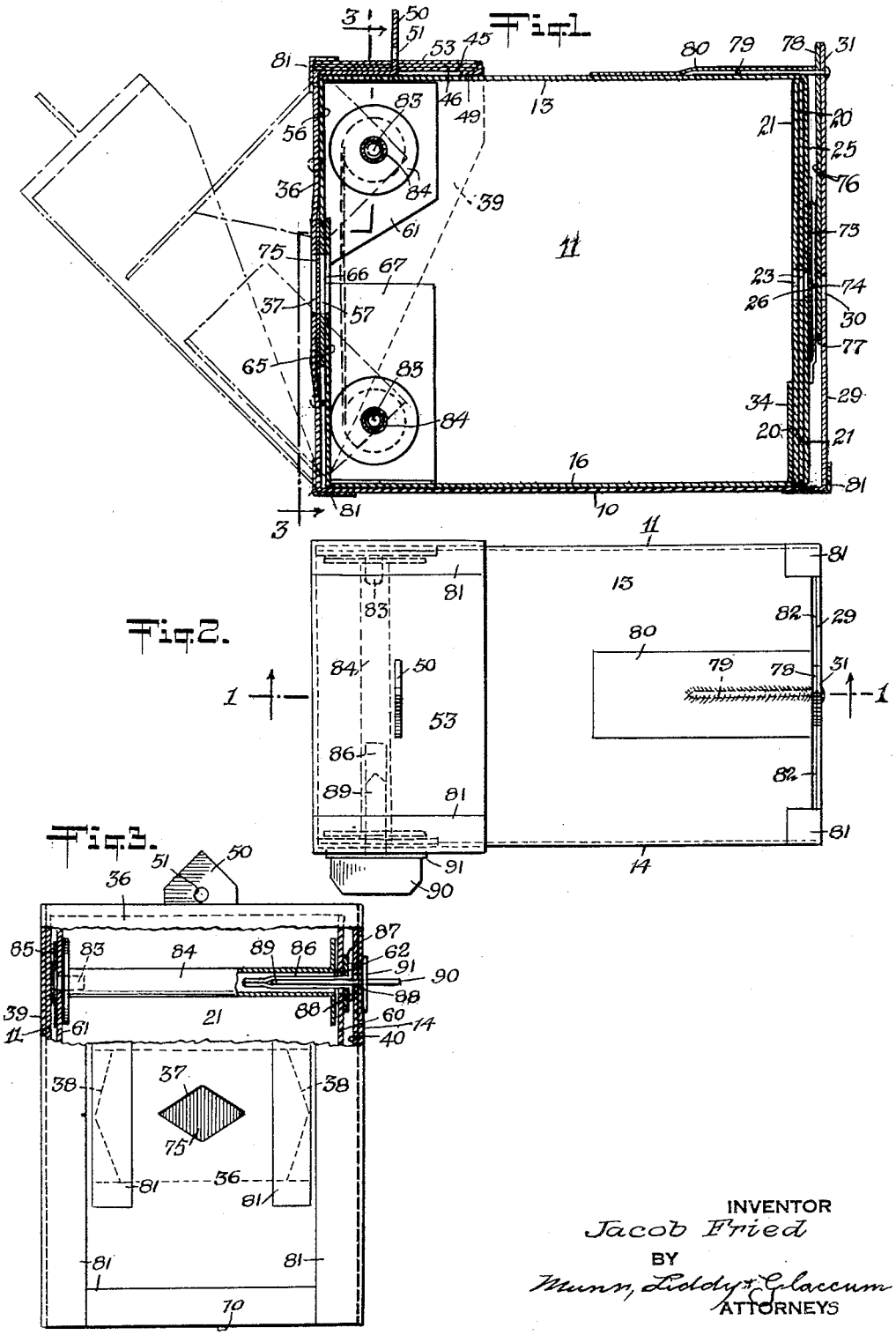
INVENTOR
Jacob Fried
BY
Munn, Liddy & Glaccum
ATTORNEYS July 3, 1951   J. FRIED   2,559,214
COLLAPSIBLE CAMERA
Filed May 20, 1948   2 Sheets-Sheet 2
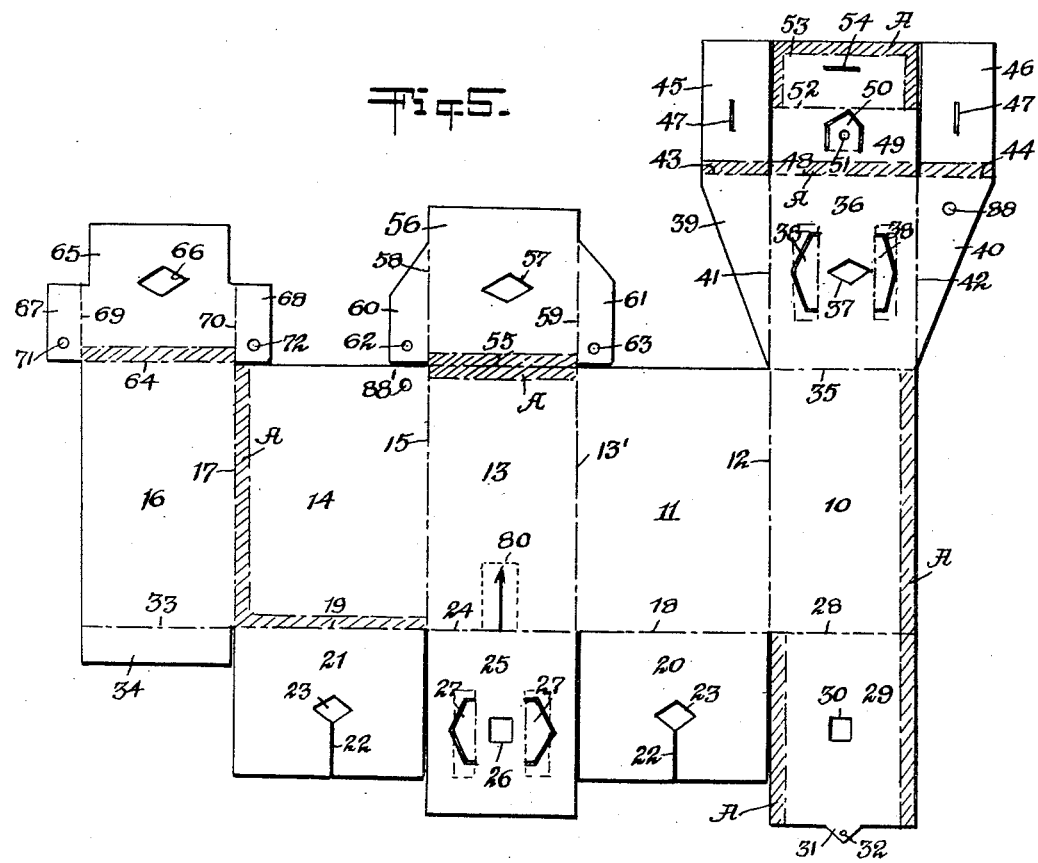
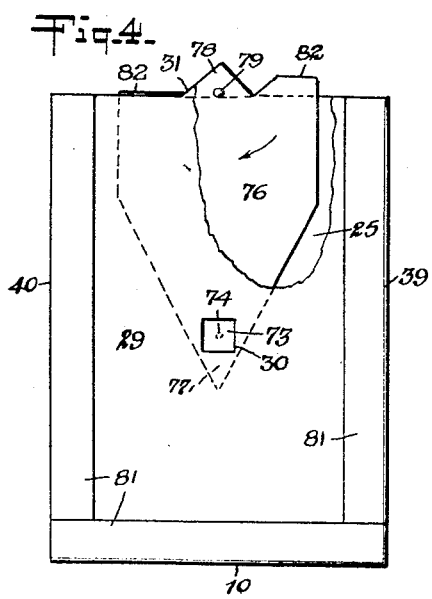
INVENTOR
Jacob Fried
BY
Munn, Liddy & Glaccum
ATTORNEYS Patented July 3, 1951

2,559,214

UNITED STATES PATENT OFFICE 2,559,214

COLLAPSIBLE CAMERA

Jacob Fried, Bronx, N. Y.

Application May 20, 1948, Serial No. 28,147

2 Claims. (Cl. 95—11)

This invention relates to new and useful improvements in cameras and has especial reference to a foldable camera made of one piece of material foldable into form and adaptable for practical operation.

A main object of the invention is to provide a simple die cut and press-scored blank which can be folded into shape and fastened in form by suitable strips of adhesive tape to form an actual operable camera which is especially attractive for young people and is capable of producing pictures from standard film.

A further object is to provide a blank ready to be folded to form, together with suitable instructions and all the accessory parts such as film-roll supporting rivets, paper shutter, pinhole paper, etc., in such form as to be sold in stores at low cost.

Further and more specific objects, features and advantages will more clearly appear from a consideration of the detailed specification hereinafter set forth, especially when taken in connection with the accompanying drawings which illustrate a present preferred form which the invention may assume and which form part of the specification.

In brief and general terms, the invention comprises a blank of suitable material such as cardboard which includes a plurality of sections, flaps, and tabs joined by crease lines capable of being folded into assembled position to form an actual operable simple and efficient camera with a pinhole diaphragm and an oscillatable shutter and a pivoted back which can be swung open or closed to remove or to insert a regular film. This idea, and device embodying the same, is immensely attractive to young people and can be used in many ways associated with advertising or publicity campaigns and yet really gives the public something real and useful as a prize or gift or premium.

The present preferred form which the invention may assume, is illustrated in the drawings, of which, Fig. 1 is a vertical longitudinal section taken on the line 1—1 through the camera shown in Fig. 2;

Fig. 2 is a top plan view of the assembled camera;

Fig. 3 is a vertical cross section taken on the line 3—3 of Fig. 1;

Fig. 4 is a front elevation of the camera with part broken away to show the oscillating shutter; and Fig. 5 is a plan view of the outside of the die-cut blank from which the camera body is formed by folding.

Referring now merely to the specific form of the invention shown in the drawings, it is to be seen that the camera is formed from a die-cut blank shown in Fig. 5 which blank may be creased along desired lines dividing the various sections thereof from each other. The blank essentially is formed with several sections as follows:

A bottom outside section 10, an adjacent side section 11 connected along crease line 12 to section 10, a top section 13 connected along crease line 13' to side section 11, an opposite side section 14 connected to top section 13 along crease line 15, an inner bottom section 16 connected along crease line 17 to side section 14.

Along their front edges the side sections 11 and 14 are joined respectively along crease lines 18 and 19 to inner front closure interlocking flaps 20 and 21 provided with slits 22 extending inward from their outer edges to apertures 23 therein preferably diamond shaped as shown. The top section 13 is connected at its front edge along crease line 24 to an intermediate flap 25 having a central preferably square aperture 26 and laterally adjacent ears 27 struck from the material of the flap 25. The outer bottom section 10 is connected at its front edge along crease line 28 to an outer closure flap 29 having a central preferably square aperture 30 and an extended pointed ear 31 centrally of its outer edge and this ear is provided with a small hole 32 intermediate its depth. The inner bottom section 16 is connected at it front edge along crease line 33 with a small reinforcing tab 34 which may be glued along its surface to adjacent surfaces of flaps 20 and 21 when they are folded in assembled relation.

Bottom section 10 along its rear edge is connected along crease line 35 to an outer closure flap 36 having a preferably central aperture 37 preferably diamond shaped, with adjacent ears 38 struck from the material of the flap 36 as shown. The closure flap 36 has lateral tapered tabs 39 and 40 connected to its lateral sides along crease lines 41 and 42 respectively. The respective bases of the tabs 39 and 40 are connected along crease lines 43 and 44 to tabs 45 and 46 each provided with a slit 47. The outer edge of flap 36 is connected along crease line 48 to a tab 49 having an ear 50 struck therefrom and provided with a hole 51. The tab 49 is connected along crease line 52 with a tab 53 having a slit 54 therein. The tabs 45 and 46 are separate from tabs 49 and 53 but lie along the sides thereof as shown.

Top section 13 along its rear edge is connected along crease line 55 with a flap 56 having a central hole 57 preferably diamond-shaped. The flap 56 along its sides is connected along crease lines 58 and 59 to tabs 60 and 61 having holes 62 and 63 therein.

Inner bottom section 16 along its rear edge is connected along crease line 64 to a flap 65 having a central aperture 66 therein preferably diamond-shaped. This flap has lateral tabs 67 and 68 connected thereto along crease lines 69 and 70 and the tabs are provided with holes 71 and 72 therein.

A sheet of black paper or similar material 73 is slipped across the aperture 26 in the flap 25 and its ends are disposed beneath the adjacent ears 27 and then covered with any suitable strips of material such as transparent adhesive tape. This sheet has a pinhole 74 formed therein as shown in Fig. 1.

A sheet of red transparent material 75 shown in Figs. 1 and 3 is slipped across the aperture 37 in the flap 36 and its ends are disposed beneath the ears 38 and taped down in any desired manner.

A shutter is formed of a suitable material such as blackened cardboard and has a body portion 76 with a lower pointed portion 77 adapted to be swung across the pinhole opening 74 in the sheet 73 which is disposed across the aperture 26 in the flap 25 as above described. The top of the shutter plate 76 is provided with an upward extending ear 78 apertured to receive a pin 79 which also projects through the aperture 32 in the ear 31 on the upper edge of the flap 29 previously mentioned, when the parts are folded in assembled position. The end of this pin is taped to the top section 13 by suitable means such as strip 80 of adhesive material shown in Figs. 1 and 5.

In assembling the camera into operative form and position from the flat blank shown in Fig. 5, the various steps are as follows:

1. Fold the sections 10, 11, 13, 14, and 16 along their intermediate crease lines until the inner bent bottom section 16 overlies the outer bottom section 10. They can be held in this position by means of suitable adhesive tape such as shown at 81 in the various parts of the drawings.

2. The body portion having been thus positioned, the front flaps and tabs may be assembled as follows: Fold the flaps 20 and 21 into a common plane, interlocking them by the means of slits 22. This will align the respective apertures 23 therein. The tab 34 on section 16 may be bent up and adhesively connected to the rear faces of the flaps 20 and 21. The intermediate flap 25 is then folded down against the flaps 20 and 21 and its aperture 26 will align with the apertures in said flaps. The pinhole sheet 73 is supported on this flap as previously described. The shutter plate is then disposed against the folded flap 25 with its ear 78 projecting above the top edge thereof, and then the outer flap 29 is brought up against the back of the shutter plate so that its ear 31 with the pin 79 therein may be aligned with the ear 78 so that the pin will pass through the hole in the ear 78 forming a pivot axis for the shutter. On each side of the ear 78 the shutter has upwardly extending flanges 82 which are displaced as to their level so that when the shutter is in normal position as shown in Fig. 4, one of these flanges only will project above the top of the camera box and when the shutter is swung to one side of the pinhole 74 by depression of the raised flange 82 shown in Fig. 4, the other flange 82 is raised to enable the shutter to be moved back to normal position after the proper exposure interval has elapsed. As stated the pin 79 is taped down to the top of section 13. Thus the front part of the camera is completely assembled and we have a pinhole opening, and a swinging shutter disposed to swing between the outer section 29 and the intermediate section 25. As shown, the section 29 when in position, may be taped to the adjacent section corners as shown in Fig. 4 by means of the strips 81 above mentioned.

3. The rear portion of the camera may be assembled by first bending the tabs 60, 61 and 67, 68 at right angles to their respective flaps 56 and 65 and extending down as viewed in Fig. 5. The flaps 56 and 65 are then swung around their crease lines 55 and 64 to lie in adjacent planes across the rear face of the camera body. Which one is folded inside the other is immaterial. However, it will be seen that, with the body sections assembled, the flap 56 will then extend downwardly and the flap 65 will extend upwardly and when thus disposed in adjacent planes their apertures 57 and 66 will be aligned. The tabs 60, 61 and 67, 68 of these flaps being at right angles to the flaps will then extend along the adjacent inner walls of the side sections 11 and 14. The holes 71 and 72 in the tabs of the lower flap 65 receive headed rivets 83 which extend inwardly toward each other to extend into the ends of a film spool 84 to support the same therebetween. The heads of these rivets or studs are covered and held in place by means of adhesive tape 85 as shown at the top left in Fig. 3, the lower spool not being visible. The similar tabs 60 and 61 of the upper flap 56 are similarly bent and also receive one of these rivets or studs 83 through hole 13 to support the left end of the upper spool 84 as seen in Fig. 3. The right end of this spool is supported in a different manner as follows: A single strip of metal 86 is bent on itself in the middle and its ends are bent outwardly at right angles and underneath the bent ends is disposed a washer 87. This unit is projected through the hole 62 in the tab 60 of the flap 56 and supports the right end of the upper spool 84. The hole 62 in the tab 60 is, when folded, in line with a hole 88 on tab 40 on the flap 36, and with a hole 88' in the top of side wall 14. Through this hole 88 there extends a metal key 89 and this key extends into tight position between the bent portions of the strip 86 above mentioned. This key has an enlarged head 90 disposed outside the wall of tab 40 as seen in Fig. 3 and a washer 91 of any suitable material is disposed beneath this head. This key is used to turn the upper spool in the usual manner and also aids in keeping the back flap 36 and its associated parts in folded position with the tabs 39 and 40 lying snugly against the outside of rear sides of the walls 11 and 14.

4. To fold the parts to form the top of the back flap 36 which fits snugly around the rear of the camera box, the tabs 39 and 40 are swung down at right angles from the position shown in Fig. 5 thus bringing these tabs in parallel planes and they are disposed snugly along the rear outside of the side walls 11 and 14 as seen in Figs. 1 and 2. The flap 36 is then swung up to lie back of the flaps 56 and 65 and the tab 49 at its top is swung down to lie along the rear of top section 13, with the apertured ear 50 disposed upright as seen in Fig. 1. The tabs 45 and 46 are then swung down over the tab 49 and the ear 50 projects up through the slits 47 therein. The tab 53 is then swung down over the tabs 45 and 46 with the ear 50 projecting up through the slit 54 therein. This folded assembly is then held together with the adhesive tape 81 as shown in Fig. 1, along the top rear edge thereof as shown. The fact that the key 89 extends through from the outside of the tab 40 will hold this rear flap and associated parts in position but to swing it back to remove or install a new film, it is merely necessary to remove the key by pulling it out and then swing the unit back exposing the flaps 56 and 65 supporting the spools which can then be handled. The red sheet 75 across the opening 37 in the flap 36 will permit the numbers on the film to be observed in the usual manner.

By lining up the aperture 51 in the ear 50 with the tip of the ear 31 a very simple and efficient arrangement for sighting the camera is afforded. Thus it is clear that out of a simple die-cut blank of cardboard or other similar material can be folded and assembled a simple efficient camera in a few minutes by one who is willing to follow a few simple directions. Preferably, of course, the inside and outside surfaces of the blank are coated black to further diminish the chance of light entrance. When the camera is assembled the only parts that are thereafter movable are the shutter 76 and the back cover flap 36 with its associated parts which form a pivoted back cover to open and close the back of the camera for the removal and insertion of film.

As shown in Fig. 5, the blank is provided with definite marked area, shown by cross hatching, and numerated as areas A to indicate to the person assembling the camera from the blank the areas along which the gummed tape is applied to hold the parts together after they are folded into assembled cooperative relation.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. A camera comprising top, bottom, and side walls formed and folded from one piece of material, interlocking laterally extending integral flaps closing the front end thereof, a flap integrally connected to one of said walls, a pinhole sheet supported on said last-mentioned flap, and a closure flap having an opening to admit light to the pinhole and being pivotally connected to another wall and swingable in an adjacent plane to the other flaps, the top of said last-mentioned flap having a projecting ear with an aperture therein, and a pin extending through said aperture and extending across the top of the camera and means to fasten said pin in position to hold said flaps in operative relation, all of said flaps having aligned openings therein.

2. A camera formed on one piece of material foldable and having bottom, top, and side walls, a flap foldable across the front of the camera and having an aperture, a sheet of opaque material disposed across the aperture with a pinhole therein in line with said aperture, a closure flap having an opening to admit light to the pinhole and being foldable against the rear of the first-mentioned flap and a pivoted shutter plate disposed between said two flaps, the upper ends of the shutter plate and the last-mentioned flap having upwardly projecting pointed ears projecting above the top surface of the top wall of the camera, a pin to project through said ears along the top of the camera and means to tie the pin down on the top wall of the camera.

JACOB FRIED.

REFERENCES CITED

The following references are of record in the file of this patent:

UNITED STATES PATENTS

| Number | Name | Date |
| --- | --- | --- |
| 648,385 | Burns | May 1, 1900 |
| 648,929 | Goldberg | Oct. 22, 1901 |
| 690,498 | Webb | Jan. 7, 1902 |
| 742,159 | Burton | Oct. 27, 1903 |
| 948,939 | Thornton | Feb. 8, 1910 |
| 1,107,125 | Walker | Aug. 11, 1914 |
| 1,595,997 | Cocanari | Aug. 17, 1926 |
| 1,703,346 | Knorpp | Feb. 26, 1929 |
| 1,723,590 | Wallace | Aug. 6, 1929 |
| 1,774,563 | Parsons et al. | Sept. 2, 1930 |
| 1,831,794 | Adams | Nov. 10, 1931 |
| 1,861,850 | Fuerst | June 7, 1932 |
| 1,931,210 | Steinacker | Oct. 17, 1933 |
| 2,203,376 | Witte | June 4, 1940 |
| 2,326,870 | Lessler | Aug. 17, 1943 |
| 2,352,994 | Morgan | July 4, 1944 |
| 2,409,605 | Bolsey | Oct. 15, 1946 |
| 2,484,510 | Hutchison, Jr. | Oct. 11, 1949 |

FOREIGN PATENTS

| Number | Country | Date |
| --- | --- | --- |
| 374,346 | Germany | Apr. 23, 1923 |